United States Patent
Weissman et al.

(10) Patent No.: US 11,425,258 B2
(45) Date of Patent: Aug. 23, 2022

(54) AUDIO CONFERENCING IN A ROOM

(71) Applicant: WAVES AUDIO LTD., Tel Aviv (IL)

(72) Inventors: Nahum Noam Weissman, Petach Tikva (IL); Matan Ben-Asher, Yahud (IL); Netanel Eyal, Tel Aviv (IL); Amir Ben-Kiki, Tel Aviv (IL)

(73) Assignee: Waves Audio Ltd., Tel Aviv (IL)

( * ) Notice: Subject to any disclaimer, the term of this patent is extended or adjusted under 35 U.S.C. 154(b) by 0 days.

(21) Appl. No.: 17/092,339

(22) Filed: Nov. 9, 2020

(65) Prior Publication Data

US 2021/0211545 A1 Jul. 8, 2021

Related U.S. Application Data

(60) Provisional application No. 62/957,372, filed on Jan. 6, 2020.

(51) Int. Cl.
*G06F 15/173* (2006.01)
*H04M 3/56* (2006.01)
*H04L 67/1074* (2022.01)
*G10L 21/0208* (2013.01)
*G06F 15/16* (2006.01)

(52) U.S. Cl.
CPC ......... *H04M 3/568* (2013.01); *G10L 21/0208* (2013.01); *H04L 67/1074* (2013.01); *G10L 2021/02082* (2013.01)

(58) Field of Classification Search
CPC ..... H04M 3/568; H04M 9/08; H04L 67/1074; H04L 65/403; H04L 65/607; H04L 65/608; H04L 65/80; G10L 21/0208; G10L 2021/02082

USPC ................................................. 709/205, 231
See application file for complete search history.

(56) References Cited

U.S. PATENT DOCUMENTS

| | | | | |
|---|---|---|---|---|
| 8,401,178 B2* | 3/2013 | Chen | ...................... | H04R 3/005 379/406.03 |
| 8,406,415 B1* | 3/2013 | Lambert | ............... | H04M 9/082 379/406.02 |
| 8,898,058 B2* | 11/2014 | Shin | ........................ | G10L 25/78 704/208 |
| 9,237,225 B2* | 1/2016 | Garcia | .................. | H04M 9/082 |

(Continued)

FOREIGN PATENT DOCUMENTS

| | | |
|---|---|---|
| GB | 2493801 A | 2/2013 |
| WO | WO-2019070597 A1 * | 4/2019 ........... G10L 21/038 |

OTHER PUBLICATIONS

GB2017683.0 search and examination report.
GB2017683.0 response to 1st examination report.

*Primary Examiner* — Karen C Tang
(74) *Attorney, Agent, or Firm* — Dr. Hanan Farber Patent Agent Ltd.

(57) ABSTRACT

First and second computer systems and respective first and second microphones thereof receive respective portions of a same audio input signal. Audio buffers received respectively from the first and second computer system include data encoded from respective microphone inputs of the first and the second computer systems. The received audio buffers are synchronized and corrected for gain differences between the received audio buffers to produce corrected audio buffers. The corrected audio buffers are mixed into an output buffer. The synchronization reduces echo when the output buffer is played at a remote peer computer system.

17 Claims, 6 Drawing Sheets

(56) References Cited

U.S. PATENT DOCUMENTS

| | | | |
|---|---|---|---|
| 9,583,115 B2* | 2/2017 | Atti | G10L 19/06 |
| 10,110,994 B1* | 10/2018 | Davis | H04R 1/406 |
| 11,146,909 B1* | 10/2021 | Pinto | G10L 25/06 |
| 2012/0287769 A1* | 11/2012 | Saleem | H04M 9/082 |
| | | | 370/201 |
| 2013/0044871 A1 | 2/2013 | O'Donovan | |
| 2015/0287422 A1* | 10/2015 | Short | G01S 13/723 |
| | | | 704/205 |
| 2016/0012813 A1* | 1/2016 | Every | G10L 21/02 |
| | | | 381/66 |
| 2016/0050491 A1* | 2/2016 | Ahgren | H04M 9/082 |
| | | | 381/66 |
| 2018/0219922 A1* | 8/2018 | Bryans | H04L 65/403 |
| 2019/0108843 A1* | 4/2019 | Atti | G10L 21/038 |
| 2021/0058517 A1* | 2/2021 | Serbajlo | H04L 12/1822 |

\* cited by examiner

AUDIO CONFERENCING IN A ROOM

BACKGROUND

1. Technical Field

The present invention relates to audio conferencing and improvement of audio quality during an audio conference.

2. Description of Related Art

Voice over Internet Protocol (VoIP) communication includes encoding voice as digital data, encapsulating the digital data into data packets, and transporting the data packets over a data network. A conference call is a telephone call between two or more participants at geographically distributed locations, which allows each participant to be able to speak to, and to listen to, other participants simultaneously. A conference call among the participants may be conducted via a voice conference bridge or centralized server. The conference call connects multiple endpoint devices (VoIP devices or computer systems) associated with the participants using appropriate Web conference communication protocols. Alternatively, conference calls may be mediated peer-to-peer in which audio may be streamed directly between participants' computer systems without an intermediary server.

BRIEF SUMMARY

Various systems and methods are disclosed herein in a network including a first computer system and a second computer system and respective first and second microphones thereof in an acoustic environment. The first microphone and the second microphone receive respective portions of a same audio input signal. Audio buffers received respectively from the first and second computer system include data encoded from respective microphone inputs of the first and the second computer systems. The received audio buffers are synchronized and corrected for gain differences between the received audio buffers to produce corrected audio buffers. The corrected audio buffers are mixed into an output buffer. The synchronization reduces echo when the output buffer is played at a remote peer computer system. Mixing the corrected audio buffers may include emphasizing an audio buffer from a computer system currently being used for audio input and reducing an audio input into a microphone attached to a computer system not currently being used for audio input. The synchronization and mixing into corrected audio buffers may be performed by the first computer system and/or the second computer system. Alternatively, the synchronization and the mixing into corrected audio buffers may be performed by a server in the network. Prior to synchronization and mixing, the system/method may identify that the microphones of the first and the second computer system may receive portions of a same audio input signal. An audio buffer from a remote peer computer system of the network, outside the acoustic environment, may be received. The received audio buffers may be sent to the first and second computer systems with respective delays so that the received audio buffers play synchronously at the first and second computer systems. Alternatively, the received audio buffer may be sent to one of the first and the second computer systems.

Various computer readable media are disclosed, that, when executed by a processor, cause the processor to execute methods disclosed herein.

BRIEF DESCRIPTION OF THE DRAWINGS

The invention is herein described, by way of example only, with reference to the accompanying drawings, wherein.

Figure 1:
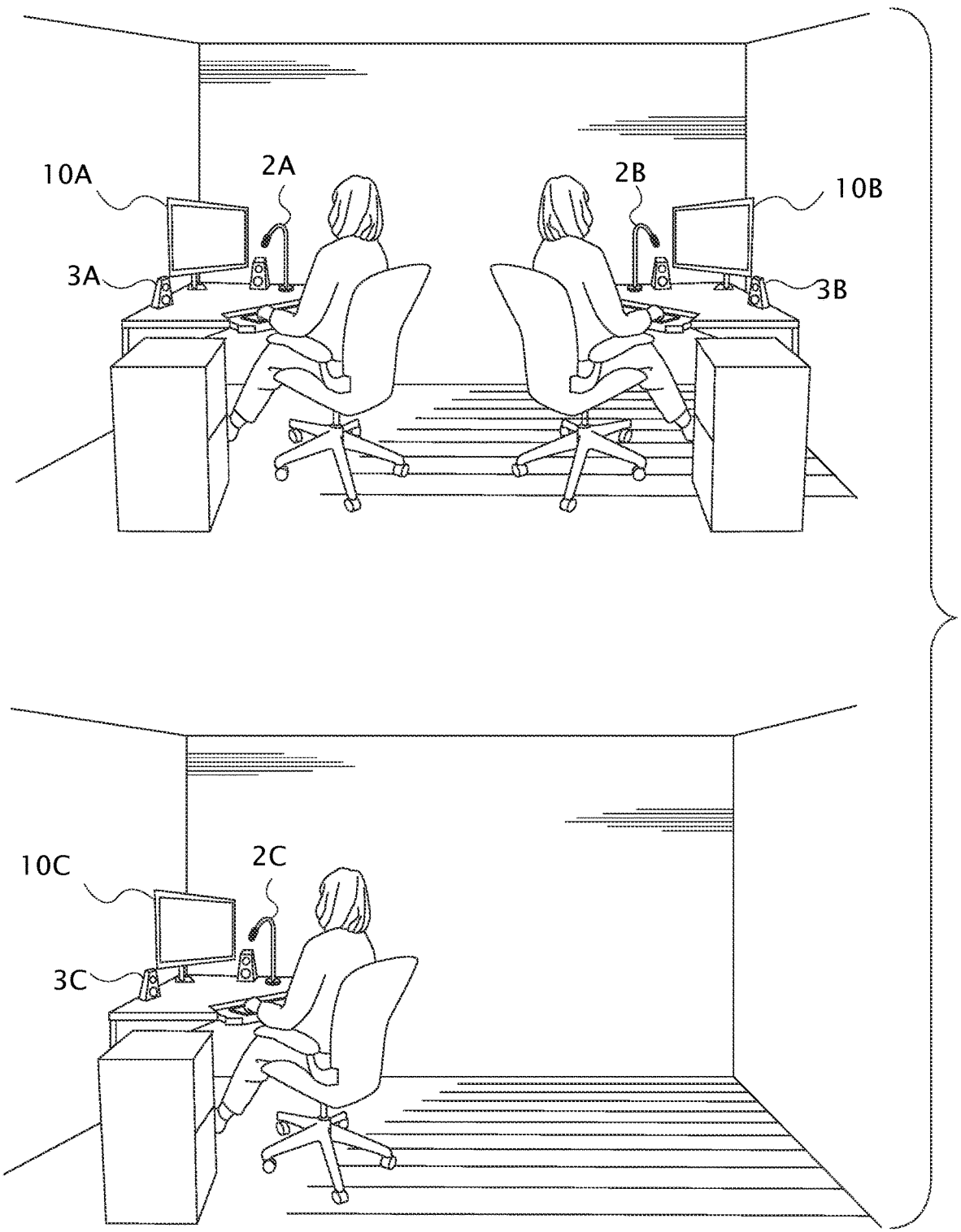
FIG. 1 illustrates a scenario, according to features of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

By way of introduction, aspects of the present invention are directed to a system and method of reducing audio echo or unwanted reverberation in an audio conference or audio-video conference which is implemented over a computer network. Specifically, during an audio conference using Voice over Internet Protocol, (VoIP) by way of example, a participant may use a computer workstation equipped with a microphone to participate in the conference. Various embodiments of the present invention may be implemented in VoIP audio conferences implemented by peer-to-peer or by VoIP server or hybrids thereof.

Referring now to the drawings, reference is now made to FIG. 1 which illustrates a scenario, according to features of the present invention. FIG. 1 illustrates three participants operating respectively three workstations or computer systems 10A, 10B, and 10C, including respectively microphones 2A, 2B and 2C and loudspeakers 3A, 3B and 3C. Workstations 10A, 10B are collocated in a single room. Workstation 10C is a remote peer computer system operating in another room, another city or another continent. When there are two participants in a single location, e.g. a single room, the speech of a participant may be received by microphone 2A of her workstation and also by microphone 2B of her roommate's work station. Both workstations 10A and 10B transmit through the network parallel audio streams to remote participants and when both audio streams of the participant's voice are played, the remote participants of the conference hear an echo of the same voice. Conventionally, the participants of the conference sharing a room may be asked to ensure that only one microphone is unmuted in order to insure sound quality.

Figure 1A:
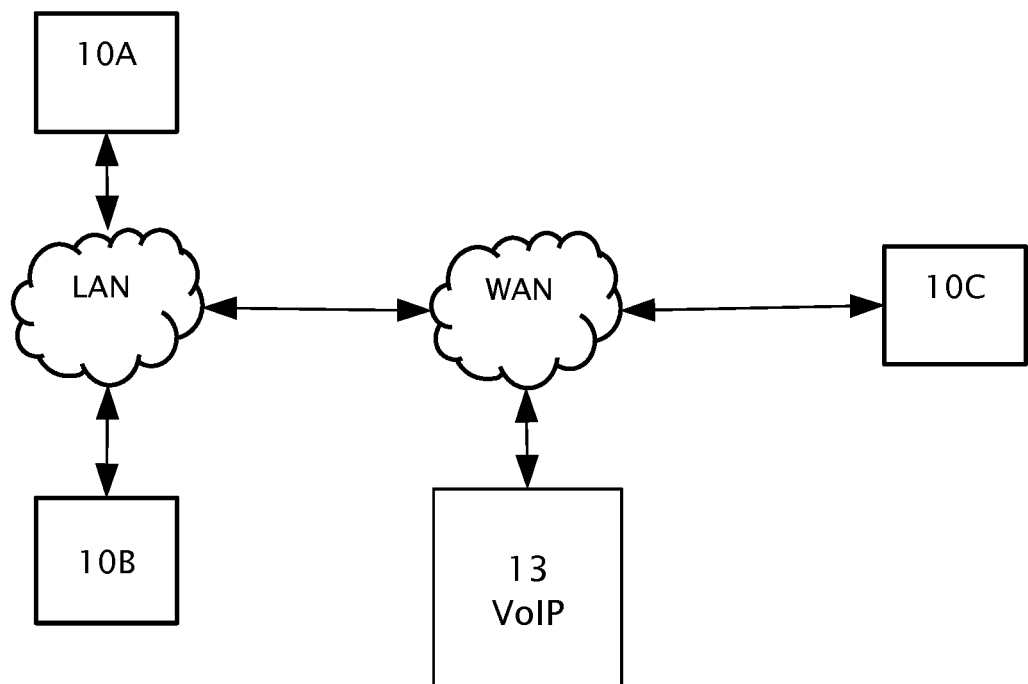
FIG. 1A illustrates schematically conventional network connections between computer systems participating in an audio conference.
Figure 1B:
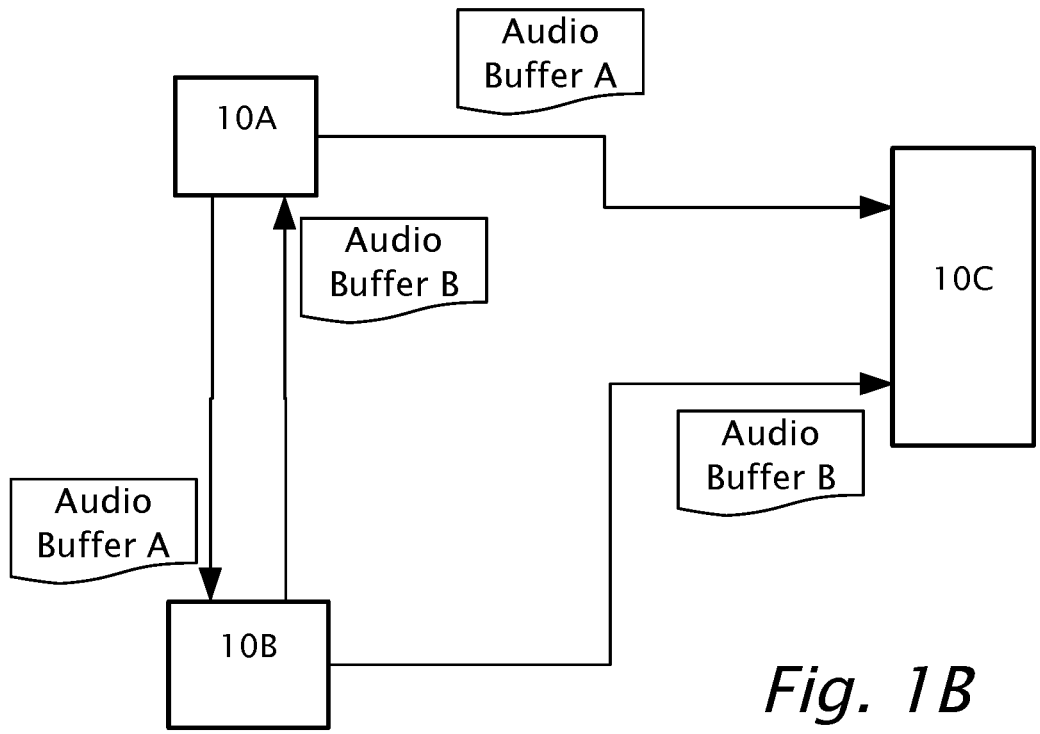
FIG. 1B illustrates conventional audio stream during an audio conference.

Reference is now also made to FIG. 1A which illustrates schematically network connections between computer systems 10A, 10B, and 10C, and Voice over Internet Protocol (VoIP) server 13. Computer systems 10A and 10B may be conventionally interconnected by a local area network (LAN) which may be implemented by a cabled network, e.g. IEEE 802.3 Ethernet, or a wireless network, e.g. IEEE 802.11 Wifi. Reference is now also made to FIG. 1B, which illustrates conventional peer-to-peer audio streaming during an audio conference, by way of example. Specifically, computer system 10A transmits audio buffer A to computer systems 10B and 10C and similarly computer system 10B transmits audio buffer B to computer systems 10A and 10C. In the scenario shown in FIG. 1, in which the same speech from a participant is encoded into both audio buffers A and B, with a sufficiently long delay greater than ~30 milliseconds, then when mixed and played at computer system 10C, the speech as played at computer system 10C may be heard with an echo or an unwanted reverberation.

Figure 2:
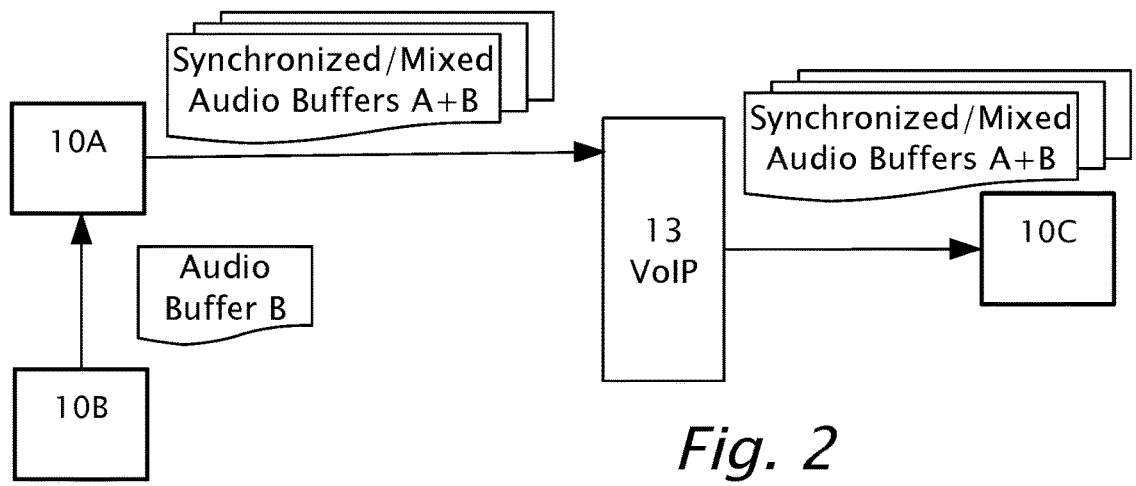
FIG. 2 illustrates schematically audio streaming during an audio conference, according to a feature of the present invention.

Reference is now also made to FIG. 2, which illustrates schematically audio streaming during an audio conference, according to a feature of the present invention. Accordingly, audio buffer B may be transmitted from computer system 10B and is received by computer system 10A. At computer system 10A, audio buffers A and B may be synchronized, e.g. within 30 milliseconds, mixed and transmitted to VoIP server 13. VoIP server 13 may transmit the synchronized and mixed audio buffer to remote computer system 10C, at which the sound is played without an echo.

Figure 3:
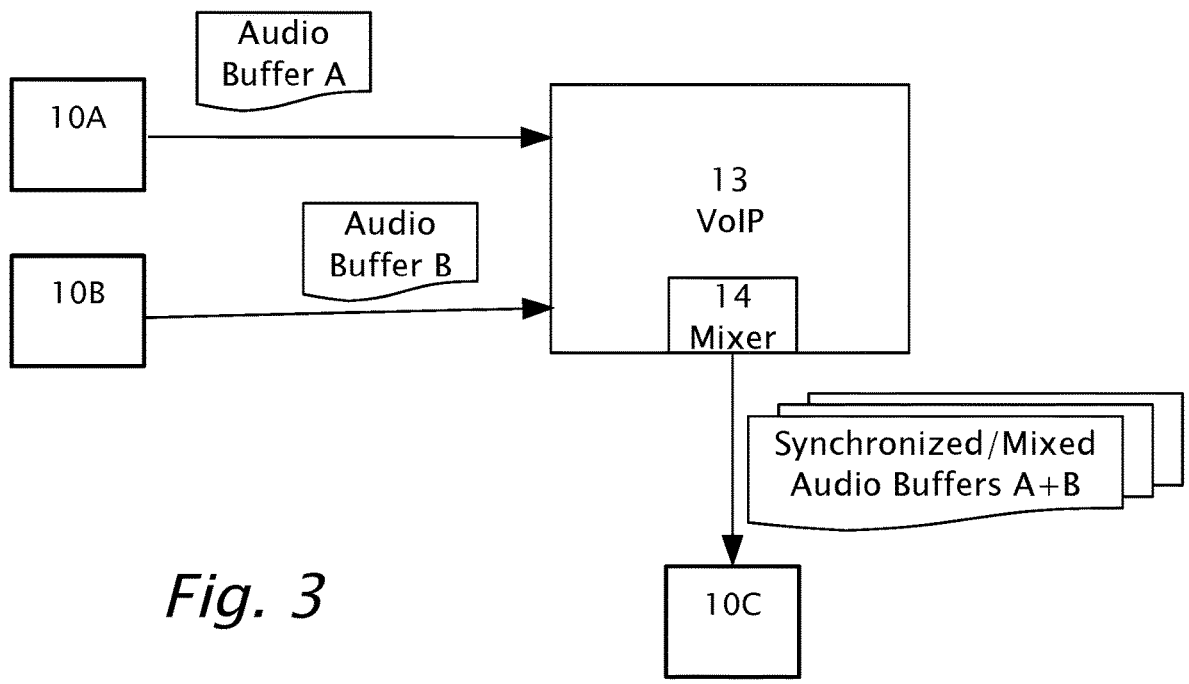
FIG. 3 illustrates schematically audio streaming during an audio conference, according to another feature of the present invention.

Reference is now also made to FIG. 3, which illustrates schematically audio streaming during an audio conference, according to another feature of the present invention. Computer systems 10A and 10B individually transmit audio buffers A and B respectively to VoIP server 13. VoIP server 13 includes a module 14 which may synchronize and mix audio buffers A and B into a synchronized/mixed audio buffer so that audio plays at computer system 10C without an echo.

Figure 5:
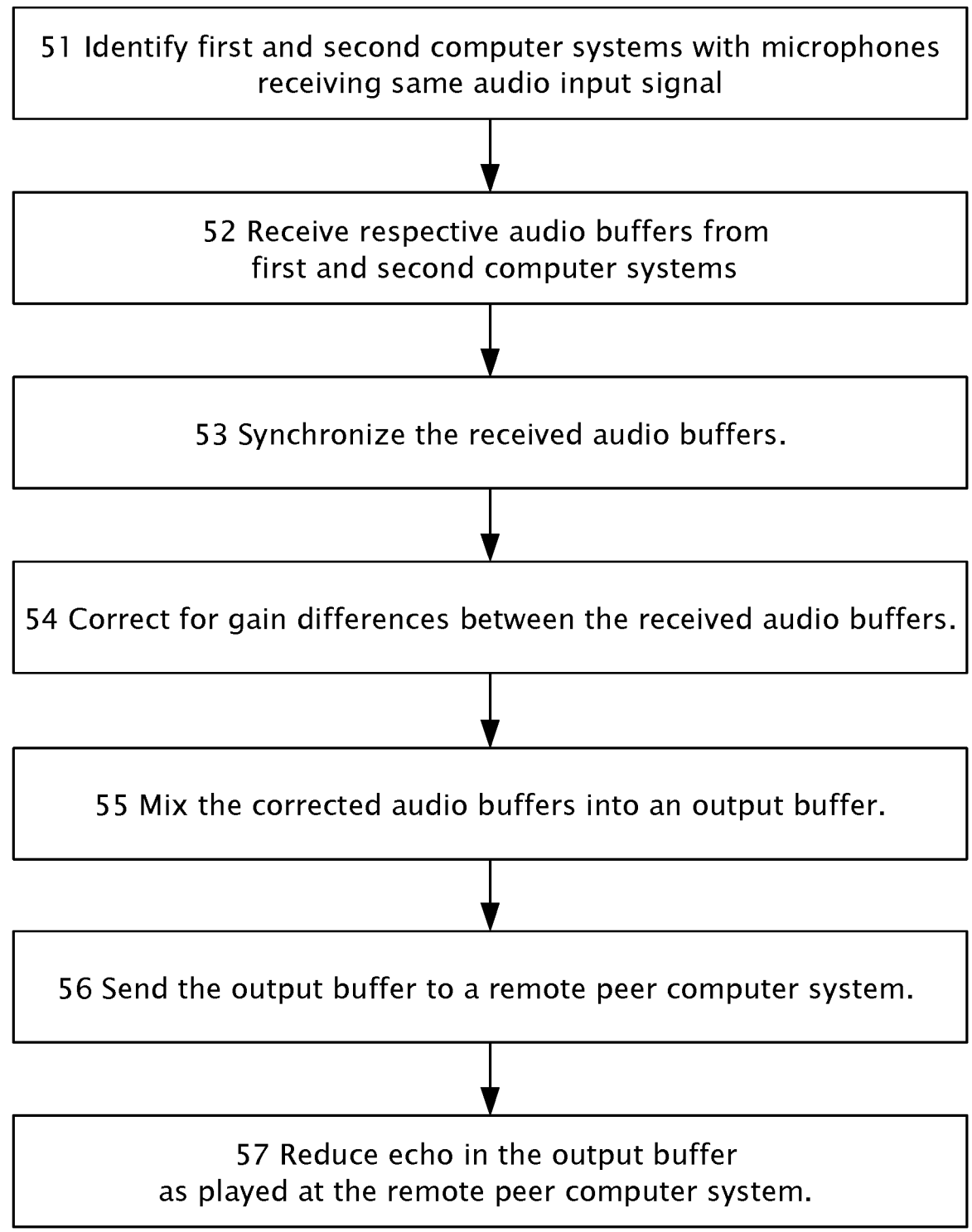
FIG. 5 illustrates a method, according to features of the present invention.

Reference is now also made to FIG. 5 which illustrates a method 50, according to features of the present invention. In step 51, a conferencing application may identify whether two or more computer systems 10 participating in an audio conference have microphones 2 which may receive the same audio input signal. Identification (step 51) may be performed by prompting a participant whether or not another participant of the audio conference is sharing a room with the participant. In step 52, respective audio buffers may be received from computer systems 10A and 10B and the audio buffers A and B are synchronized, (step 53). In step 54, differences in gain may be corrected between the received audio buffers A and B. A microphone 2A may be less sensitive and/or a signal therefrom may stream with lower level than another microphone 2B so that gain may be added to microphone 2A to balance levels when played. It is also desirable to increase gain of the microphone being used by the participant who is currently speaking relative to other unmuted microphones of participants in the conference. In step 55, the audio buffers are mixed into an output buffer and the output buffer is sent (step 56) to a remote peer computer system 10C. In step 57, echo, is reduced in the output buffer as played in the remote computer system 10C.

Figure 4A:
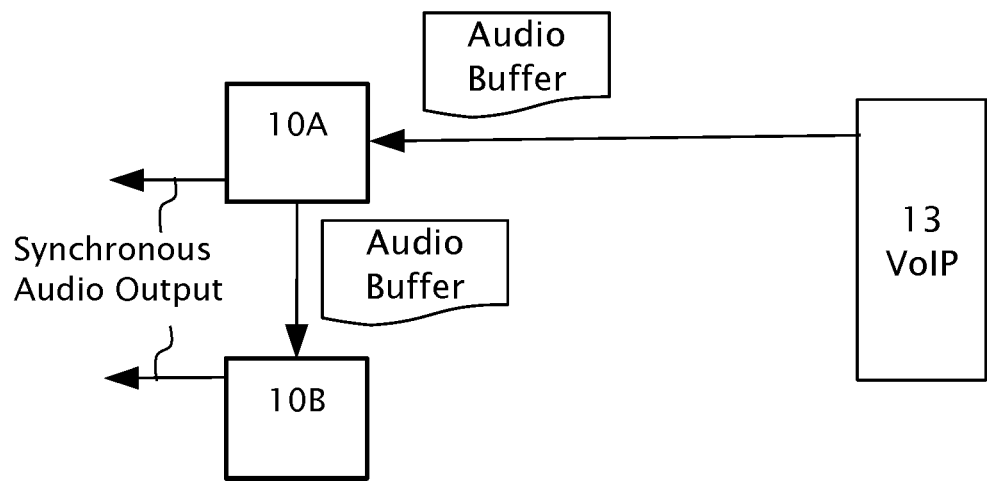
FIG. 4A illustrates an embodiment of audio streaming for received audio during an audio conference, according to features of the present invention.
Figure 4B:
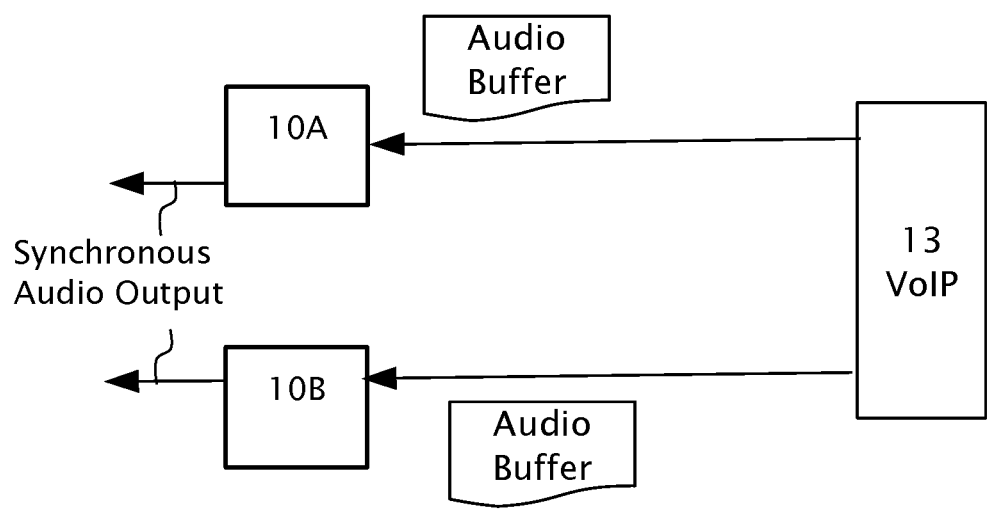
FIG. 4B illustrates an alternative embodiment of audio streaming for received audio during an audio conference, according to features of the present invention.

Reference is now made to FIG. 4A which illustrates audio streaming for received audio during an audio conference, according to features of the present invention. Computer system 10A may receive an audio buffer from VoIP server 13 which includes combined audio from remote peer computer systems (not shown). Computer system 10A may transmit audio locally to computer system 10B so that all computer systems 10 in the same room play the audio synchronously. Reference is now also made to FIG. 4B, which illustrates audio streaming for received audio during an audio conference in another configuration. Synchronized audio buffers are sent directly from VoIP server 13 to computer systems 10A and 10B. The received audio buffers may be sent to first computer system 10A and to second computer system 10B with respective delays so that the received audio buffers play synchronously at first computer system 10A and second computer system 10B. Alternatively, one loudspeaker 3 in the same room may play the audio.

Figure 6:
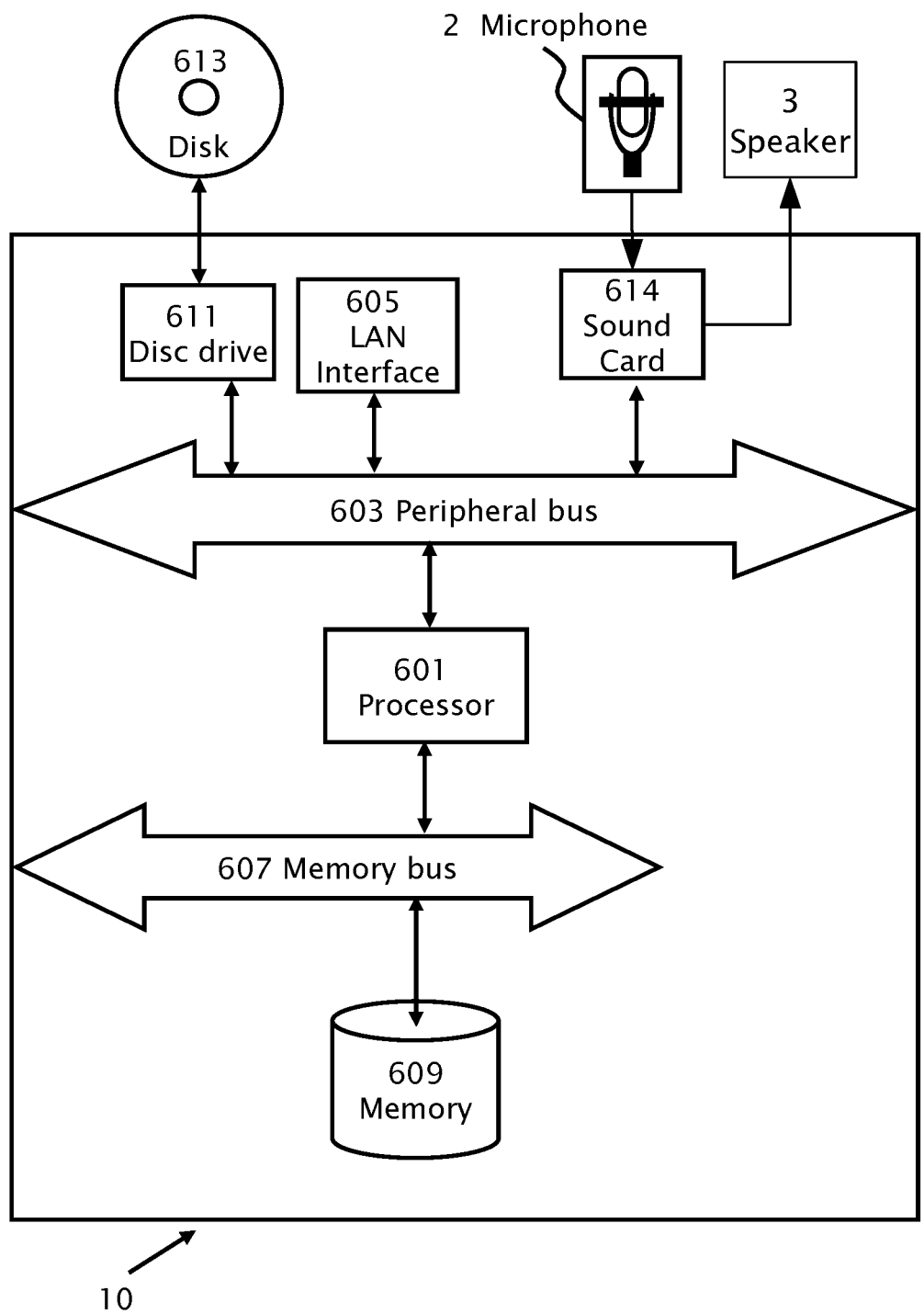
FIG. 6 illustrates schematically a simplified computer system, according to conventional art.

Reference is now made to FIG. 6 which illustrates schematically a simplified computer system 60 according to conventional art. Computer system 10 includes a processor 601, a storage mechanism including a memory bus 607 to store information in memory 609 and a network interface 605 operatively connected to processor 601 with a peripheral bus 603. Computer system 10 further includes a data input mechanism 611, e.g. disk drive for a computer readable medium 613, e.g. optical disk. Data input mechanism 611 is operatively connected to processor 601 with peripheral bus 603. Operatively connected to peripheral bus 603 is sound card 614. The input of sound card 614 operatively connected to the output of microphone 2 and to an input of loudspeaker 3.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone, a laptop computer or tablet where internal modules (such as a memory and processor) work together to perform operations on electronic data.

In this description and in the following claims, a "network" is defined as any architecture where two or more computer systems may exchange data. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The various aspects, embodiments, implementations or features of the described embodiments can be used separately or in any combination. Various aspects of the described embodiments can be implemented by software, hardware or a combination of hardware and software.

The terms "device", workstation and "computer system" are used herein interchangeably.

The term "connected" as used herein refers to both wired and wireless computer connections The term "emphasize" as used herein refers to a relative increase in audio gain or audio level.

The term "echo" as used herein refers to an auditory sensation when two audio signals with similar or identical audio inputs are played asynchronously with a time delay greater than about 10-50 milliseconds.

The terms "synchronous" or "synchronization" as used herein is less than about 50 milliseconds. Under some circumstances, with participants in a different position of a large room, there will be some reverberation dependent on the room size. Under such circumstances, the terms "synchronous" or "synchronization" may refer to less than about 30 milliseconds. Alternatively, in some embodiments of the present invention, it may be desirable to reduce reverberation even further so that synchronization to less than about 20 milliseconds or less than 10 milliseconds may be suggested to be effective.

The transitional term "comprising" as used herein is synonymous with "including", and is inclusive or open-ended and does not exclude additional, unrecited elements or method steps. The articles "a", "an" is used herein, such as "a computer system", "an audio buffer" have the meaning of "one or more" that is "one or more computer systems", "one or more audio buffers".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

Although selected embodiments of the present invention have been shown and described, it is to be understood the present invention is not limited to the described embodiments. Instead, it is to be appreciated that changes may be made to these embodiments without departing from the scope of invention defined by the claims and the equivalents thereof.

The claimed invention is:

1. A system operable in a network including a first computer system and a second computer system, wherein the first and second computer systems and respective first and second microphones thereof, are in an acoustic environment wherein the first microphone and the second microphone receive respective portions of a same audio input signal, the system configured to:
   receive data from respective audio buffers of the first and second computer systems, wherein the data are encoded from respective microphone inputs of the first and the second computer systems;
   synchronize the received data from the respective audio buffers and correct for a gain difference between the received data of the first and second microphone inputs, to produce thereby corrected data; and
   mix the corrected data into an output buffer;
   wherein synchronization reduces echo when the corrected data are played at a remote peer computer system.

2. The system of claim 1, wherein mixing the corrected data includes emphasizing data from a computer system currently being used for audio input and reducing input from a microphone attached to a computer system not currently being used for audio input.

3. The system of claim 1, wherein synchronization and mixing are performed by a computer system selected from the group consisting of the first computer system and the second computer system.

4. The system of claim 1, wherein synchronization and mixing are performed by a server in the network.

5. The system of claim 1, further configured to:
   identify that the microphones of the first and the second computer system receive portions of a same audio input signal.

6. The system of claim 1, further configured to:
   receive remote data from a remote peer computer system of the network, wherein the remote peer computer system is outside the acoustic environment; and
   send the remote data to the first and second computer systems with respective delays so that the remote data plays synchronously at the first and second computer systems, or send the remote data to one of the first and the second computer systems.

7. A computerized method performable in a network including a first computer system
   and a second computer system, wherein the first and second computer systems and respective first and second microphones thereof are in an acoustic environment wherein the first microphone and the second microphone receive portions of a same audio input
   signal, the method comprising:
   receiving data from respective audio buffers of the first and second computer systems, wherein the data are encoded from respective microphone inputs of the first and the second computer systems;
   synchronizing the received data and correcting for a gain difference between the received data of the first and second microphone inputs, to produce thereby corrected data; and
   mixing the corrected data into an output buffer;
   wherein said synchronizing reduces echo when the corrected data are played at a remote peer computer system.

8. The computerized method of claim 7, further comprising:
   sending the corrected data to a remote peer computer system of the network outside the acoustic environment.

9. The computerized method of claim 7, wherein said mixing the corrected data includes emphasizing data from a computer system currently being used for audio input and reducing input from a microphone attached to a computer system not currently being used for audio input.

10. The computerized method of claim 7, wherein the synchronizing and the mixing are performed by a computer system selected from the group consisting of the first computer system and the second computer system.

11. The computerized method of claim 7, wherein the synchronizing and the mixing are performed by a server in the network.

12. The computerized method of claim 7, further comprising identifying that the microphones of the first and the second computer system receive portions of a same audio input signal.

13. The computerized method of claim 7, further comprising:
receiving remote data from a remote peer computer system of the network, wherein the remote peer computer system is outside the acoustic environment; and
sending the remote data to the first and second computer systems with respective delays so that the remote data play synchronously at the first and second computer systems, or sending the remote data for playing to one of the first and the second computer systems.

14. A non-transitory computer-readable storage medium storing instructions that, when
executed by a processor, cause the processor to perform a method in a network including a first computer system and a second computer system, wherein the first and second computer systems and respective first and second microphones thereof are in an acoustic environment wherein the first microphone and the second microphone receive portions of a same audio input signal, the method comprising:
receiving data from respective audio buffers of the first and second computer systems, wherein the data are encoded from respective microphone inputs of the first and the second computer systems;
synchronizing the received data and correcting for a gain difference between the received data from the first and second microphone inputs, to produce thereby corrected data; and
mixing the corrected data into an output buffer;
wherein said synchronizing reduces echo when the corrected data are played at a remote peer computer system.

15. The non-transitory computer-readable storage medium of claim 14, wherein said mixing includes emphasizing data from a computer system currently being used for audio input and reducing input from a microphone attached to a computer system not currently being used for audio input.

16. The non-transitory computer-readable storage medium of claim 14, further storing instructions that, when executed by a processor, cause the processor to perform:
identifying that the microphones of the first and the second computer system receive portions of a same audio input signal.

17. The non-transitory computer-readable storage medium of claim 14, further storing
instructions that, when executed by a processor, cause the processor to perform:
receiving remote data from a remote peer computer system of the network, wherein the remote peer computer system is outside the acoustic environment; and
sending the remote data to the first and second computer systems with respective delays so that the remote data play synchronously at the first and second computer systems, or sending the remote data for playing to one of the first and the second computer systems.

\* \* \* \* \*